United States Patent Office 3,444,090
Patented May 13, 1969

3,444,090
STABILIZING FILMING AMINE EMULSIONS
Albert Michal, Brookfield, Ill., assignor to W. R. Grace & Co., New York, N.Y., a corporation of Connecticut
No Drawing. Filed Mar. 1, 1967, Ser. No. 619,578
Int. Cl. B01j *13/00;* C09k *3/00*
U.S. Cl. 252—312                                    9 Claims

ABSTRACT OF THE DISCLOSURE

Filming amine emulsions for inhibiting corrosion containing an aliphatic amine, acetic acid, a non-anionic emulsifier, and a methacrylic polymer have improved freeze-thaw stability.

---

This invention relates to improvements in forming cold water dispersions of aliphatic fatty amines.

In summary, this invention is a cold water dispersible amine composition having freeze-thaw stability comprising an aqueous emulsion containing an aliphatic amine having from 8 to 22 carbon atoms; acetic acid; a non-anionic water soluble emulsifying agent selected from the group consisting of block polymers of ethylene oxide and propylene oxide on a backbone of propylene glycol, random copolymers of ethylene oxide and propylene oxide, block polymers of ethylene oxide and propylene oxide with lower alkyl diamines, polyoxyethylene fatty amines, polyoxyethylene N-fatty trimethylene diamines, alkyl halide quaternary salts of polyoxyethylene fatty amines, and alkyl halide quaternary salts of polyoxyethylene N-fatty trimethylene diamines; and from 0.01 to 1 weight percent of a water-soluble polymer having repeated units with the formula

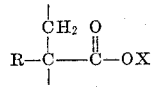

wherein R is an alkyl group having up to 3 carbon atoms and X is H, $NH_4$, Na or K. The molar ratio of acetic acid to fatty amine is from about 0.1 to 0.6:1, and the weight ratio of emulsifying agent to fatty amine is from about 0.01 to 1:1.

Fatty amines (those containing from 8 to 22 carbon atoms per molecule, and consisting primarily of primary saturated mono-amines) are essentially insoluble in water. For various applications, such as for use as corrosion inhibitors for steam condensate return lines, ore floatation, fabric softening, soil stabilization, and other industrial processes, it would be highly desirable to use a composition of the fatty amine which is cold water dispersible.

There are currently two water dispersible forms of octadecylamine available commercially. The first consists of either octadecylamine acetate, octadecylamine glycolate, or mixtures of octadecylamine and octadecylamine acetate or glycolate. The second consists of a combination of octadecylamine with non-ionic emulsifiers. Octadecylamine acetate disperses readily in hot water, at temperatures at 185° F. or above, but only slowly in cold water. One percent aqueous dispersions of octadecylamine acetate and a blend of 60% octadecylamine and 40% octadecylamine acetate have pH values of 5.3 and 6.2, respectively. They also have very limited tolerance against emulsion breaking characteristics of polyvalent anions which may be present in hard water, softened water, contaminated process water and condensate.

In order to eliminate localized corrosion caused at the injection point of acidic dispersions of the amine, it has been suggested that the octadecylamine be introduced as an alkaline emulsion. However, these emulsions are usually in the form of pastes, are not cold water dispersible, and when highly diluted, require frequent agitation to maintain emulsion stability and prevent "creaming."

When the fatty amine is combined with acetic acid in certain molar proportions and dissolved in water, a composition with minimal viscosity is obtained. The viscosity of this composition can be lowered substantially by adding a small amount of certain non-anionic (either nonionic or cationic) emulsifying agents. The product emulsion was found, however, to have insufficient resistance to breakdown and separation after one cycle of freezing and thawing.

It is an object of this invention to provide a fatty amine emulsion which is resistant to breakdown after one or more cycle of freezing and thawing.

All concentrations are herein given as weight percents unless stated to the contrary.

The emulsifying agent employed contains chains of oxyethylene groups in its molecule, and preferably contains at least two chains of oxyethylene groups on at least one nitrogen atom in the molecule. The latter may typically be polyoxyethylated fatty amines or diamines or quaternary salts thereof. More specifically, when the molar ratio of acetic acid to amine is in the range from about 0.1 to 0.6:1, the cold water dispersibility of the amine composition is substantially improved, and this improvement can be even further enhanced by the addition of the non-anionic emulsifying agent in amounts ranging from about 0.01 to 1 times the amount of amine present by weight.

The following emulsifying agents have been found effective in the composition of this invention:

(1) Block polymers of ethylene oxide and propylene oxide on a backbone of propylene glycol ("Pluronics"):

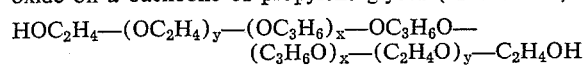

where $x$ is at least 10 and $y$ is at least 1, the molecular weights ranging from about 1000 to 13,000.

(2) Polyoxyethylene fatty amine ("Ethomeens"):

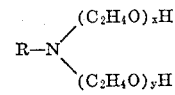

$R = C_{12}$ to $C_{22}$
$x+y$ is at least 2, but no more than 100.

(3) Polyoxyethylene N-fatty trimethylene diamines ("Ethoduomeens"):

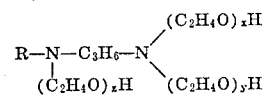

$R = C_{12}$ to $C_{22}$
$x+y+z$ is at least 3, but no more than 150.

(4) Alkyl chloride quaternary salts of polyoxyethylene fatty amines ("Ethoquads"):

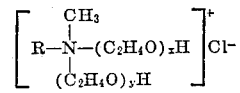

$R = C_{12}$ to $C_{22}$
$x+y$ is at least 2, but no more than 100.

(5) Alkyl chloride quaternary salt of polyoxyethylene N-fatty trimethylene diamines ("Ethoduoquads"):

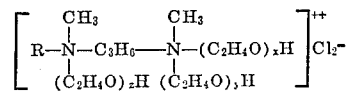

where

R=$C_{12}$ to $C_{22}$ $x+y+z$ is at least 3, but no more than 150.

(6) Ethylene oxide-propylene oxide random copolymers having a molecular weight of from 500 to 20,000 ("Ucons").

(7) Block polymers of ethylene oxide and propylene oxide on an alkylene diamine backbone ("Tetronics"):

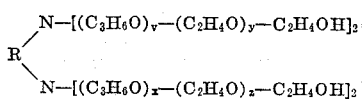

wherein R is a lower alkylene radical (2–4 carbons), and wherein $v+x$ is at least 10 and $y+z$ is at least 2, the molecular weights ranging from about 300 to 20,000.

The polymers employed in the composition of this invention include polymethacrylic acid, polyethacrylic acid, copolymers and terpolymers of acrylic acid, methacrylic acid and ethacrylic acid with each other and other vinyl monomers, and alkali metal and ammonium salts thereof. When these polymers are prepared by hydrolyzing the corresponding nitrile polymers, they frequently contain nitrile and amide groups in addition to the carboxylic acid or salt groups. These polymers must be water-soluble and can have a molecular weight of less than 200,000 and preferably from 1,000 to 20,000. The composition contains from 0.01 to 1 and preferably from 0.025 to 0.075 percent of the polymers.

The preferred composition of this invention contains 5 to 10 percent aliphatic water-insoluble amine, 0.2 to 1.0 percent acetic acid, from 0.5 to 1.0 percent emulsifying agent, and from 0.025 to 0.075 percent of alkali metal polymethacrylates having a molecular weight of from 1,000 to 20,000.

This invention is further illustrated by the following specific but non-limiting examples.

EXAMPLE 1

This example shows a method for preparing the composition and its unique freeze-thaw stability.

Water having a temperature of 190° F., acetic acid and Daxad 30 composition (a 25% aqueous solution of sodium polymethacrylate having a molecular weight of about 2000 to 8000) were mixed. Melted primary hydrogenated tallow amine was added to the mixture with agitation. Then Ethoduoquad T/20 was added, and the mixture was allowed to cool with continued agitation for several hours. The proportion of each ingredient was sufficient to provide the following final composition.

| | Wt. percent |
|---|---|
| Primary hydrogenated tallow amine | 7.50 |
| Glacial acetic acid | 0.45 |
| Daxad 30 | 0.20 |
| Ethoduoquad T/20 | 0.75 |
| Water | 91.10 |

The final emulsion was found to be completely stable after one freeze-thaw cycle with no detectable separation of components. The composition without the polymethacrylate frequently and unpredictably evidences badly separated components following one freeze-thaw cycle.

EXAMPLE 2

In this example, the procedure of Example 1 is followed except that 1.0 wt. percent of a 6.25% solution of sodium polymethacrylate having a molecular weight of about 100,000 is substituted for the Daxad 30 composition. The product was stable after one freeze-thaw cycle.

The stable emulsion is also made by the procedure of Example 1 substituting polymethacrylic acid having a molecular weight of about 80,000 for the Daxad 30 composition.

EXAMPLE 3

The following improved emulsions are prepared by the procedure of Example 1 with 7.50 wt. percent hydrogenated tallow amine, 0.45% glacial acetic acid, and 0.20 wt. percent Daxad 30 composition but with different emulsifiers:

| Sample No. | Emulsifier | Emulsifier concentration | Freeze-thaw stability |
|---|---|---|---|
| 3 | Ethomeen 18/60 | 1.50 | No separation. |
| 4 | Ethoduomeen T/40 | 1.00 | Do. |
| 5 | Pluronic L-62 | 1.50 | Do. |
| 6 | Ethoquad T/20 | 1.50 | Do. |
| 7 | None | | Separated. |

The invention claimed is:

1. A cold water dispersible amine composition having freeze-thaw stability consisting essentially of an aqueous emulsion containing an unsubstituted aliphatic amine having from 8 to 22 carbon atoms; acetic acid; a non-anionic water-soluble emulsifying agent selected from the group consisting of block polymers of ethylene oxide and propylene oxide on a backbone of propylene glycol having a molecular weight of from 1,000 to 13,000, block polymers of ethylene oxide and propylene oxide on a backbone of lower alkylene diamines having a molecular weight of from 300 to 20,000, random ethylene oxide-propylene oxide copolymers having a molecular weight of from 500 to 20,000, polyoxyethylene fatty amines having from 2 to 100 oxyethylene groups, polyoxyethylene N-fatty trimethylene diamines having from 3 to 150 oxyethylene groups, alkyl halide quaternary salts of the aforesaid polyoxyethylene fatty amines, and alkyl halide quaternary salts of the aforesaid polyoxyethylene N-fatty trimethylene diamines; and from a 0.01 to one weight percent of a water-soluble polymer having a molecular weight of from 1000 to 200,000 and having, as repeated units,

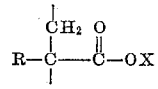

wherein R is an alkyl group having up to 3 carbon atoms and X is H, $NH_4$, Ua or K, the molar ratio of acetic acid to unsubstituted aliphatic amine being from about 0.1 to 0.6:1, and the weight ratio of emulsifying agent to unsubstituted aliphatic amine being from about 0.01 to 1:1.

2. The cold water dispersible amine composition of claim 1 wherein the aliphatic amine is octadecylamine.

3. The cold water dispersible amine composition of claim 1 wherein the water-soluble polymer has a molecular weight of from 1000 to 20,000.

4. The cold water dispersible amine composition of claim 1 wherein the emulsifying agent is a block polymer of ethylene oxide and propylene oxide on a backbone of propylene glycol having a molecular weight of from 1000 to 13,000.

5. The cold water dispersible amine composition of claim 1 wherein the emulsifying agent is a polyoxyethylene fatty amine having from 2 to 100 oxyethylene groups.

6. The cold water dispersible amine composition of claim 1 wherein the emulsifying agent is a polyoxyethylene N-fatty trimethylene diamine having from 3 to 150 oxyethylene groups.

7. The cold water dispersible amine composition of claim 1 wherein the emulsifying agent is an alkyl chloride quaternary salt of a polyoxyethylene fatty amine having from 2 to 100 oxyethylene groups.

8. The cold water dispersible amine composition of claim 1 wherein the emulsifying agent is an alkyl chloride quaternary salt of a polyoxyethylene N-fatty trimethylene diamine having from 3 to 150 oxyethylene groups.

9. The cold water dispersible amine composition of claim 8 consisting essentially of water and from 5 to 10 weight percent aliphatic amine, from 0.2 to 1.0 weight percent acetic acid, from 0.5 to 1.0 weight percent emulsifying agent, and from 0.025 to 0.075 weight percent of an alkali metal polymethacrylate having a molecular weight of from 1000 to 20,000.

References Cited

UNITED STATES PATENTS

| | | | |
|---|---|---|---|
| 2,460,259 | 1/1949 | Kahler | 252—390 X |
| 2,956,889 | 10/1960 | Denman | 252—392 X |
| 3,088,796 | 5/1963 | Kahler et al. | 252—392 X |
| 3,239,470 | 3/1966 | Michal | 252—392 X |

HERBERT B. GUYNN, *Primary Examiner.*

I. GLUCK, *Assistant Examiner.*

U.S. Cl. X.R.

21—2.7; 252—8.8, 61, 389, 390, 392, 401, 403

PO-1050
(5/69)

UNITED STATES PATENT OFFICE
CERTIFICATE OF CORRECTION

Patent No. 3,444,090          Dated May 13, 1969

Inventor(s) Albert H. Michal

It is certified that error appears in the above-identified patent and that said Letters Patent are hereby corrected as shown below:

Column 4, line 43, the formula "Ua" should read ---Na---.

SIGNED AND
SEALED

OCT 21 1969

(SEAL)
Attest:

Edward M. Fletcher, Jr.
Attesting Officer

WILLIAM E. SCHUYLER, JR.
Commissioner of Patents